United States Patent [19]

Chase et al.

[11] Patent Number: 4,870,311

[45] Date of Patent: Sep. 26, 1989

[54] WIRELESS SLIP RING ASSEMBLY

[75] Inventors: John G. Chase, Palm Harbor; Charles T. Hardy, Dunedin, both of Fla.

[73] Assignee: Honeywell Inc., Minneapolis, Minn.

[21] Appl. No.: 256,023

[22] Filed: Oct. 11, 1988

[51] Int. Cl.[4] .......................... H02K 3/26; H02K 3/50; H01R 39/08

[52] U.S. Cl. ...................................... 310/232; 310/71; 310/239; 310/DIG. 6; 439/13

[58] Field of Search .................... 310/42, 71, 219, 220, 310/232, 334, 239, 242, 244, 248, 249, 251, 266, DIG. 6; 439/1, 11, 13, 28, 29, 30

[56] References Cited

U.S. PATENT DOCUMENTS

| | | | |
|---|---|---|---|
| 3,042,998 | 7/1962 | Sweett et al. | 310/232 |
| 3,448,312 | 6/1969 | Mashburn | 310/239 |
| 4,689,023 | 8/1987 | Strong III et al. | 310/DIG. 6 |
| 4,779,469 | 10/1988 | Ashley | 439/13 |
| 4,806,808 | 2/1989 | Grecksch et al. | 310/DIG. 6 |

FOREIGN PATENT DOCUMENTS

| | | | |
|---|---|---|---|
| 73903 | 3/1983 | European Pat. Off. | 439/13 |
| 62-18945 | 1/1987 | Japan | 310/71 |
| 478586 | 1/1938 | United Kingdom | 310/232 |

*Primary Examiner*—Peter S. Wong

*Assistant Examiner*—D. L. Rebsch

*Attorney, Agent, or Firm*—Roger W. Jensen

[57] ABSTRACT

A wireless slip ring assembly includes inner and outer subassemblies mounted together for undergoing rotation relative to one another. The inner subassembly includes a sleeve composed of axially spaced annular slip rings and a printed circuitboard mounted within the sleeve having spaced longitudinal sides connected at longitudinal edges and spaced conductive paths defined on the longitudinal sides and extending to the edges. The conductive paths are spaced from interior sides of the slip rings except at the longitudinal edges of the circuitboard, where each conductive path is electrically and rigidly connected to one slip ring. The outer subassembly includes a brush cylinder rotatably mounted to the inner subassembly sleeve and having apertures therethrough aligned with the slip rings, a flexible circuit attached on the brush cylinder exterior and having spaced conductive leads with locations aligned with the brush cylinder apertures, and contact brushes electrically and rigidly connected to the conductive lead locations and having end portions extending through the apertures and making electrical sliding contact with the slip rings as the inner and outer subassemblies undergo relative rotation.

20 Claims, 3 Drawing Sheets

WIRELESS SLIP RING ASSEMBLY

BACKGROUND OF THE INVENTION

1. Field of the Invention

The present invention generally relates to conducting electrical signals between bodies undergoing relative rotational motion and, more particular, is concerned with a wireless slip ring assembly.

2. Description of the Prior Art

Slip ring devices are widely used to conduct electrical signals from a first body to a second body undergoing rotational motion relative to the first body. However, most conventional slip ring devices have a multiplicity of parts and are complex, costly and time consuming to fabricate and assemble. Their complexity tends to undermine their reliability.

By way of example, fabrication and assembly of one widely used prior art slip ring device requires use of forty-eight short lengths of insulated conductor wires which have to be stripped back from their ends and then welded or soldered one at a time to twenty-four rings and twenty-four brushes. Then, the twenty-four rings are installed into a precision mold for potting after which the assembly is potted and machined to provide "V" grooves thereon. Further, both inner and outer subassemblies making up the slip ring device are typically high Q metal frame structures which have to be supported on preloaded ball bearings. In certain environments, the tolerance of the prior art slip ring device to mechanical vibration and shock is inadequate, producing ringing and clatter which causes the slip ring device to failure when its brushes begin to vibrate or "dance" in their "V" groove seats.

In view of the above-described problems with an existing typical slip ring device, a need exists for a new approach to slip ring design which will simplify fabrication and assembly and thereby enhance reliability.

SUMMARY OF THE INVENTION

The present invention provides a wireless slip ring assembly designed to satisfy the aforementioned needs. In particular, the construction of the wireless slip ring assembly of the present invention is simpler to fabricate and assemble and therefore of greater reliability. Instead of multiple wires, the slip ring assembly of the present invention is wireless, using printed circuitry for both ring and brush interfaces. Benefits are realized in reduced labor costs since fewer electrical connections are made. Also, brushes in the wireless slip ring assembly are positioned 360 degrees about a brush cylinder, thereby centering and supporting an outer subassembly relative to a relative rotatable inner subassembly of the device. Ball bearings are not required in the device.

Accordingly, the present invention is directed to a wireless slip ring assembly which includes inner and outer subassemblies capable of undergoing rotation relative to one another and of concurrently maintaining multiple electrical connections between relative rotating bodies to which the subassemblies are respectively mounted.

More particularly, the inner subassembly of the wireless slip ring assembly includes an outer hollow sleeve composed of a multiplicity of axially spaced electrically isolated annular slip rings having annular grooves defined on respective exterior sides thereof, and an inner printed circuitboard mounted within the sleeve having a plurality of spaced longitudinal sides connected at longitudinal edges.

The circuitboard of the inner subassembly has a multiplicity of spaced conductive paths defined on its longitudinal sides and extending between an end and the edges of the circuitboard. The conductive paths are spaced from interior sides of the slip rings of the sleeve except at the longitudinal circuitboard edges where each of the conductive paths is electrically and rigidly connected to one of the slip rings of the sleeve.

The outer subassembly of the wireless slip ring assembly includes a brush cylinder, a flexible printed circuit attached on an exterior side of the cylinder, and a plurality of contact brushes. The brush cylinder is rotatably mounted at its opposite ends to the sleeve of the inner subassembly and has a plurality of apertures defined therethrough aligned with the slip ring annular grooves of the sleeve. The flexible printed circuit has a multiplicity of spaced conductive leads extending between an end and a plurality of locations on the cylinder aligned respectively with the apertures in the brush cylinder. The electrical contact brushes are electrically and rigidly connected to the conductive leads at the locations thereof and have end portions which extend through the respective apertures and make electrical sliding contact with the slip rings of the sleeve within the annular grooves thereof as the inner and outer subassemblies undergo relative rotation.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
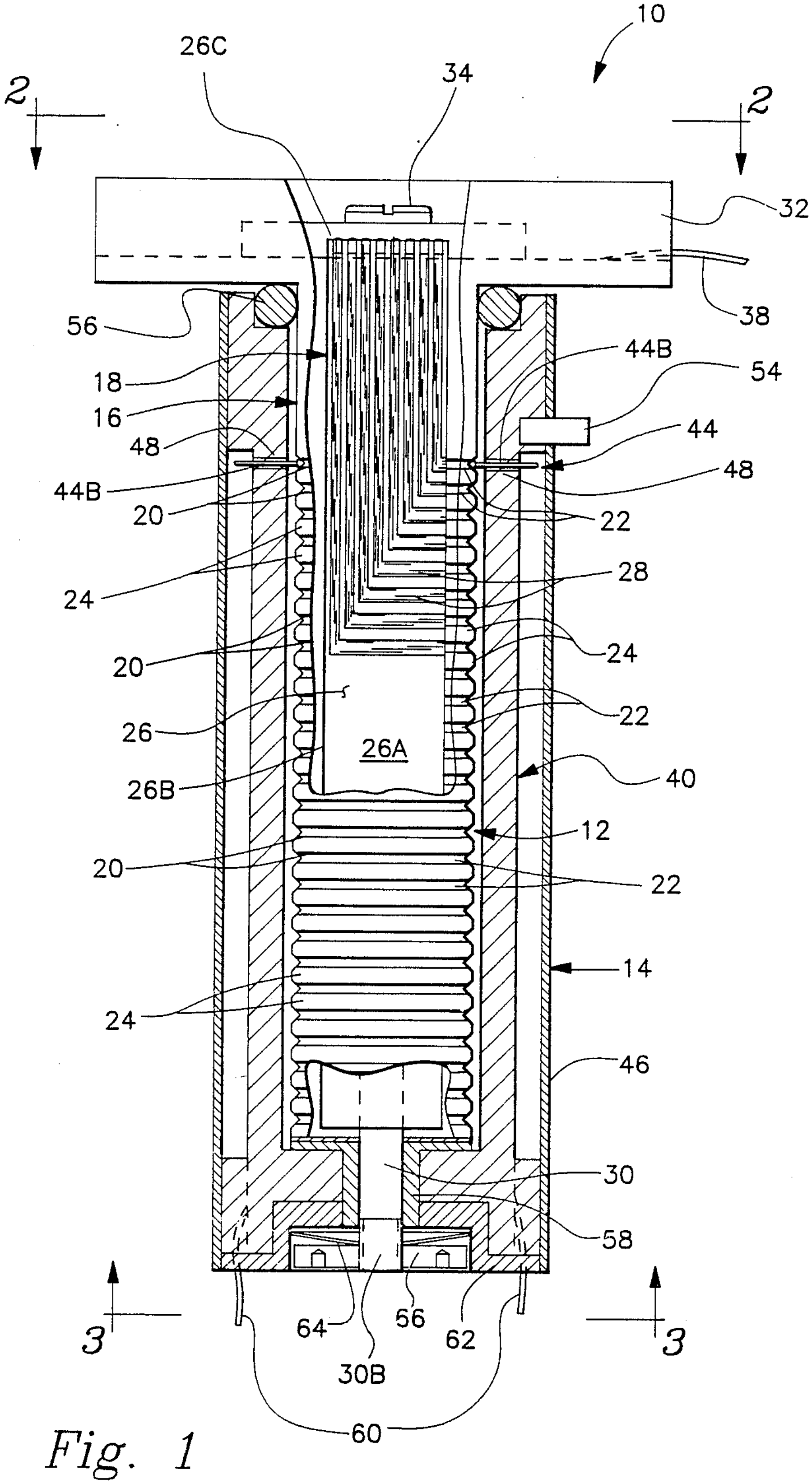
FIG. 1 is a longitudinal axial sectional view, shown partly in elevation with portions broken away, of a wireless slip ring assembly constructed in accordance with the principles of the present invention.
Figure 2:
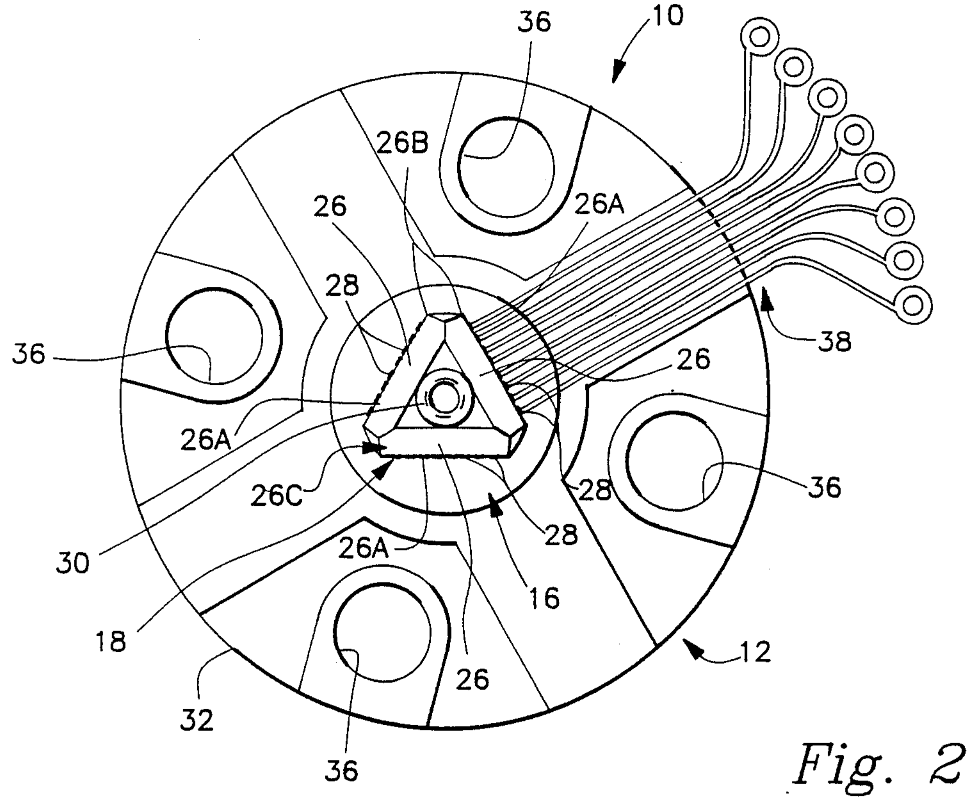
FIG. 2 is a top plan view of the wireless slip ring assembly as seen along line 2—2 of FIG. 1.
Figure 3:
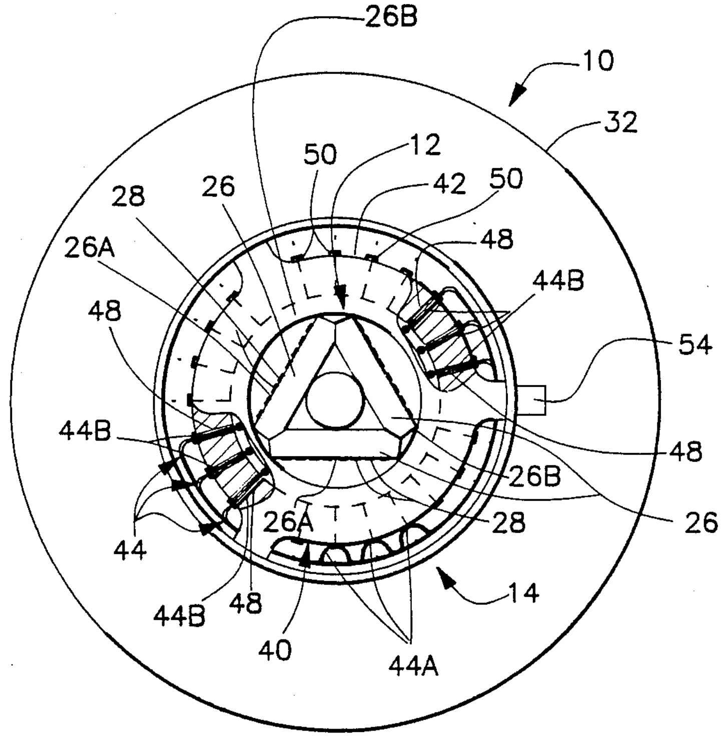
FIG. 3 is a bottom plan view, with portions broken away and sectioned, of the wireless slip ring assembly as seen along line 3—3 of FIG. 1.

Referring now to the drawings, and particular to FIGS. 1-3, there is shown a wireless slip ring assembly, generally designated by the numeral 10 and constituting the preferred embodiment of the present invention. The wireless slip ring assembly 10 generally includes inner and outer subassemblies 12, 14. The subassemblies 12, 14 are capable of undergoing rotation relative to one another and of concurrently maintaining multiple electrical connections between relative rotating bodies (not shown) to which the subassemblies are respectively mounted.

More particularly, the inner subassembly 12 of the wireless slip ring assembly 10 includes an outer elongated hollow sleeve 16 and an inner elongated printed circuitboard 18. The outer sleeve 16 of the inner subassembly 12 is composed of a multiplicity of annular slip rings 20 having respective annular grooves 22, being "V" shaped in cross-section, defined on the exterior surfaces or sides of the slip rings 20. The slip rings 20 composed of electrically conductive material are isolated electrically and spaced axially from one another by annular collars or fillers 24 of non-conductive epoxy material. By way of example, twenty-four slip rings 20 are illustrated in FIG. 1; other numbers of slip rings could be provided.

The inner printed circuitboard 18 of the inner subassembly 12 is mounted within and through the slip rings 20 of the outer sleeve 16. The circuitboard 18 preferably includes segments 26 defining a plurality of spaced apart exterior longitudinal sides 26A between longitudinal edges 26B. By way of example, three segments 26 are illustrated in FIGS. 2 and 3 arranged in a triad or triangular configuration and having the three exterior longitudinal sides 26A; other numbers of segments arranged in different configurations are possible.

The segments 26 of the circuitboard 18 have a multiplicity of generally L-shaped spaced conductive paths 28 defined on the longitudinal sides 26A thereof extending between a common end 26C and the longitudinal edges 26B thereof. The conductive paths 28 are also spaced from the interior surfaces or sides of the slip rings 20 of the outer sleeve 16 except at longitudinal edges 26B of the segments 26 where each conductive path 28 is electrically and rigidly connected to one slip ring 20. By way of example, three sets of eight conductive paths 28 each are provided on the three respective longitudinal sides 26A of the segments 26. Only one set of eight conductive paths 28 can be seen in FIG. 1.

The inner subassembly 12 also includes an elongated central rod 30 being threaded at its opposite ends. The triad of circuitboard segments 26 is inserted over and mounted upon the rod 30. Also, a circular mounting flange 32 is attached by a threaded fastener 34 to one end 30A of the central rod 30 and has a series of openings 36 for coupling the inner subassembly 12 to one body of the pair of relatively rotatable bodies (not shown) for rotation with the one body.

As seen in FIG. 2, sets of conductors 38 (only one set being shown), such as typically provided in a flex cable, are attached to the sets of conductive paths 28 at the one end 26C of the circuitboard segments 26. The conductors 38 extend therefrom to the rotatable body (not shown) upon which the inner subassembly 12 is mounted by the flange 32.

Figure 4:
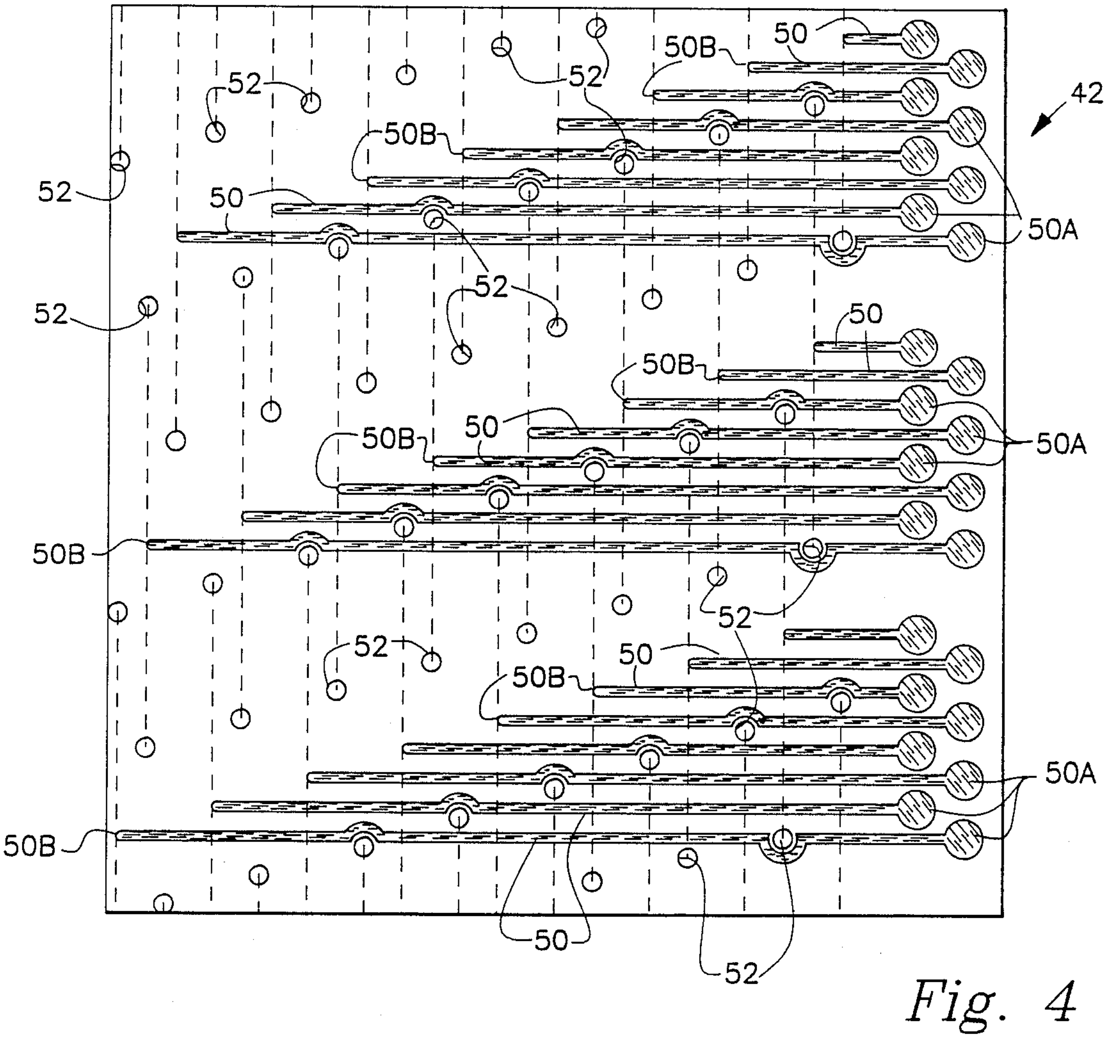
FIG. 4 is a plan view of a printed circuit for an outer subassembly of the wireless slip ring assembly of FIG. 1.

Referring now to FIG. 4 as well as FIGS. 1–3, the outer subassembly 14 of the wireless slip ring assembly 10 includes a brush cylinder 40, a flexible printed circuit 42, a plurality of spring-type electrical contact brushes 44 and an outer cylindrical protective sheath 46. The brush cylinder 40 of the outer subassembly 14 is mounted at its opposite ends for rotation relative to the sleeve 16 of the inner subassembly 12. A plurality of apertures 48 are defined through the brush cylinder 40 in alignment with the annular grooves 22 in the slip rings 20 of the inner subassembly sleeve 16.

Figure 5:
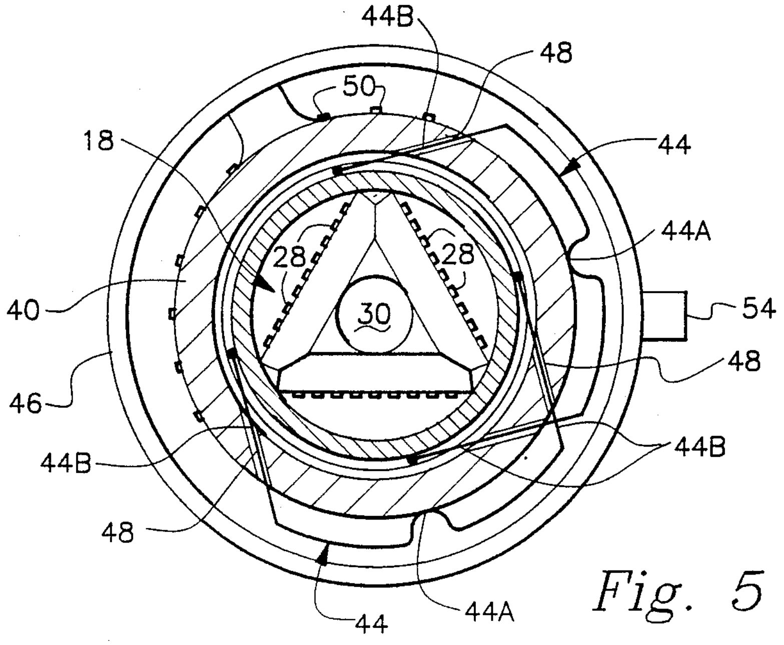
FIG. 5 is a plan view similar to that of FIG. 3, illustrating certain modifications incorporated in the wireless slip ring assembly.

The apertures 48 are formed through the brush cylinder 40 in either one of two orientations depicted respectively in FIGS. 3 and 5. As seen in FIG. 3, the apertures 48 are defined with their axes along radial lines extending from the longitudinal axis of the brush cylinder 40. Alternatively, as seen in FIG. 5, the apertures 48 are defined through the brush cylinder 40 with their axes along lines extending tangentially with respect to the annular grooves 22 on the slip rings 20. The apertures 48 are matched in pairs which are spaced circumferentially from and aligned with one another for receiving the contact brushes 44. FIG. 5 depicts two pairs of apertures 48 and two contact brushes 44 in the same plane extending in transverse relation to the axis of the brush cylinder 40; however, this is for purposes of illustration only since each pair of apertures 48 and its associated brush 44 is disposed in a separate plane from others.

The flexible printed circuit 42 of the outer subassembly 14, shown in plan layout in FIG. 4, is attached about the cylindrical exterior surface or side of the brush cylinder 40. The flexible printed circuit 42 has a multiplicity of elongated spaced conductive leads 50 extending between terminal pads 50A at one end 40A of the brush cylinder 40 and a plurality of end pads 50B each aligned respectively with pairs of holes 52 formed in the flexible circuit 42 and aligned with the pairs of apertures 48 in the brush cylinder 40.

From FIG. 4 it can be realized that the holes 52 and end pads 50B are grouped in sets each containing a pair of holes 52 and a single end pad 50B. Each set is staggered circumferentially and disposed in a separate transverse plane (depicted as a dashed line) from other sets. The pairs of apertures 48 in the brush cylinder 40 are defined in a pattern corresponding to the pairs of circuit holes 52.

The contact brushes 44 of the outer subassembly 14 are electrically and rigidly connected at their middle portions 44A to the end pad locations 50B of the conductive leads 50. The brushes 44 also have opposite end portions 44B which extend through the respective holes 52 of the printed circuit 42 and apertures 48 of the brush cylinder 40, either along radial lines as in FIG. 3 or tangential lines as in FIG. 5. The end portions 44B of the brushes 44 make sliding 360-degree electrical contact with the slip rings 20 within their annular grooves 22 as the inner and outer subassemblies 12, 14 undergo relative rotation with the respective bodies (not shown) to which they are attached. By way of example, twenty-four sets of pairs of apertures 48, twenty-four sets of pairs of holes 52, twenty-four terminal pads 50A and end pads 50B, and twenty-four contact brushes 44 are used in the assembly 10; however, other numbers of these elements can be used.

The outer protective sheath 46 of the outer subassembly 14 is inserted over the brush cylinder 40 and the contact brushes 44 mounted thereon. The sheath 46 is attached at its opposite end portions to the opposite end portions of the brush cylinder 40. The brush cylinder 40 securely mounts a drive pin 54 for coupling the outer subassembly 14 to its one body of the pair of relatively rotatable bodies for rotation with the one body. The drive pin 54 projects radially outward from the brush cylinder 40.

The assembly 10 also includes an annular damper bushing 56 and an annular thrust ring 58 at respective opposite end portions of the brush cylinder 40 for rotatably mounting the cylinder 40 relative to the the inner subassembly 12. Further, a flex cable-type connector 60 is connected to the terminal pads 50A of the flexible printed circuit 42 on the brush cylinder 40. Also, an end plate 62, spring washer 64 and retaining nut 66 are applied on the opposite end 30B of the central rod 30 of the inner subassembly 12 to retain the brush cylinder 40 thereon.

For installing the outer subassembly 14 over the inner subassembly 12, the end portions 44B of the contact brushes 44 can be yieldably deflected outwardly away from the slip rings 20 of the inner subassembly. Once installed, epoxy can be applied to the apertures 48 to anchor the brushes to the cylinder 40.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

The embodiments of the invention in which an exclusive property or right is claimed are defined as follows:

1. In a wireless slip ring assembly, an inner subassembly comprising:

(a) an outer elongated hollow sleeve composed of a multiplicity of axially spaced electrically isolated annular slip rings having annular grooves defined on respective exterior sides thereof; and (b) an inner elongated printed circuitboard mounted within said sleeve and having a plurality of spaced exterior longitudinal sides between spaced longitudinal edges and a multiplicity of spaced conductive paths defined on said longitudinal sides and extending between an end and said longitudinal edges of said circuitboard;

(c) said conductive paths being spaced from interior sides of said slip rings of said sleeve except at said longitudinal edges of said circuitboard where each of said conductive paths is electrically and rigidly connected to one of said slip rings of said sleeve.

2. The assembly of claim 1 wherein said circuitboard includes segments arranged in a triangular configuration and defining said respective exterior longitudinal sides.

3. The assembly of claim further comprising an elongated central rod with said circuitboard segments inserted over and mounted upon said rod.

4. The assembly of claim 1 further comprising a mounting flange attached to one end of said central rod, said flange for coupling said inner subassembly to one body of a pair of relatively rotatable bodies for rotation with the one body.

5. In a wireless slip ring assembly, an outer subassembly comprising:

(a) a brush cylinder having a plurality of apertures defined therethrough and being alignable with slip rings of an inner subassembly when disposed within said brush cylinder;

(b) a flexible printed circuit attached on an exterior side of said cylinder and having a multiplicity of spaced conductive leads extending between an end thereof and a plurality of locations aligned respectively with said apertures in said brush cylinder; and (c) a plurality of electrical contact brushes electrically and rigidly connected to said conductive leads at said locations thereof and having end portions which extend through said respective apertures for making electrical sliding contact with the slip rings of the inner subassembly as the inner and outer subassemblies undergo relative rotation.

6. The assembly of claim 5 wherein said apertures through said brush cylinder are defined axially along radial lines extending from a longitudinal axis of the brush cylinder.

7. The assembly of claim 5 wherein said apertures through said brush cylinder are defined axially along lines extending generally tangentially with respect to the slip rings of the inner subassembly.

8. The assembly of claim 5 further comprising means on said brush cylinder for coupling said outer subassembly to one body of a pair of relatively rotatable bodies for rotation with the one body.

9. The assembly of claim 8 wherein said coupling means is a drive pin attached on and projecting radially outward from said brush cylinder.

10. The assembly of claim 5 further comprising a protective cylindrical sheath inserted over said brush cylinder and said contact brushes mounted thereon.

11. A wireless slip ring assembly, comprising:

(a) an inner subassembly including (i) an outer elongated hollow sleeve composed of a multiplicity of axially spaced electrically isolated annular slip rings having annular grooves defined on respective exterior sides thereof and (ii) an inner elongated printed circuitboard mounted within said sleeve having a plurality of spaced longitudinal sides between spaced longitudinal edges and a multiplicity of spaced conductive paths defined on said longitudinal sides and extending between an end and said longitudinal edges of said circuitboard, said conductive paths being spaced from interior sides of said slip rings except at said longitudinal edges of said circuitboard where each of said conductive paths is electrically and rigidly connected to one of said slip rings; and (b) an outer subassembly including (i) a brush cylinder mounted at its opposite end for rotation relative to said sleeve of said inner subassembly and having a plurality of apertures defined therethrough aligned with said annular grooves of said slip rings, (ii) a flexible printed circuit attached on an exterior side of said cylinder having a multiplicity of spaced conductive leads extending between an end of said brush cylinder and a plurality of locations aligned respectively with said apertures in said brush cylinder, and (iii) a plurality of electrical contact brushes electrically and rigidly connected to said conductive leads at said locations thereof and having end portions which extend through said respective apertures and make electrical sliding contact with said slip rings within said annular grooves thereof as said inner and outer subassemblies undergo relative rotation.

12. The assembly of claim 11 wherein said circuitboard of said inner subassembly includes segments arranged in a triangular configuration and defining said respective exterior longitudinal sides.

13. The assembly of claim 11 wherein said inner subassembly further comprises (iii) an elongated central rod with said circuitboard segments inserted over and mounted upon said rod.

14. The assembly of claim 13 wherein said inner subassembly further comprises (iv) a mounting flange attached to one end of said central rod, said flange for coupling said inner subassembly to one body of a pair of relatively rotatable bodies for rotation with the one body.

15. The assembly of claim 11 wherein said apertures through said brush cylinder of said outer subassembly are defined axially along radial lines extending from a longitudinal axis of said brush cylinder.

16. The assembly of claim 11 wherein said apertures through said brush cylinder of said outer subassembly are defined axially along lines extending generally tangentially with respect to said annular grooves on said slip rings.

17. The assembly of claim 11 wherein said outer subassembly further comprises (iv) means on said brush cylinder for coupling said outer subassembly to one body of a pair of relatively rotatable bodies for rotation with the one body.

18. The assembly of claim 17 wherein said coupling means is a drive pin attached on and projecting radially outward from said brush cylinder.

19. The assembly of claim 11 wherein said outer subassembly further comprises (v) a protective cylindrical sheath inserted over said brush cylinder and said contact brushes mounted thereon.

20. The assembly of claim 11 further comprising an annular damper bushing and an annular thrust ring disposed at respective opposite ends of said brush cylinder for rotatably mounting said cylinder relative to said sleeve of said inner subassembly.

* * * * *